United States Patent [19]

Lill et al.

[11] 4,180,915
[45] Jan. 1, 1980

[54] RUNOUT COMPENSATION IN VEHICLE WHEEL ALIGNMENT MEASURING APPARATUS

[75] Inventors: Melvin H. Lill, San Jose; James L. Wiederrich, Lodi, both of Calif.

[73] Assignee: FMC Corporation, San Jose, Calif.

[21] Appl. No.: 889,167

[22] Filed: Mar. 23, 1978

[51] Int. Cl.² .................................................. G01B 11/26
[52] U.S. Cl. ................................ 33/228; 33/203.19; 33/288; 33/336
[58] Field of Search ............ 33/203.18, 203.19, 203.21, 33/288, 336, 337, 203, 301, 228

[56] References Cited

U.S. PATENT DOCUMENTS

| 3,782,831 | 1/1974 | Senften | 33/288 |
| 3,892,042 | 7/1975 | Senften | 33/288 |

Primary Examiner—William D. Martin, Jr.
Attorney, Agent, or Firm—R. S. Kelly; J. F. Verhoeven

[57] ABSTRACT

In certain wheel alignment measuring apparatus, a fixture is clamped to the rim of a wheel and an alignment sensor is pendulously mounted upon the fixture so that as the wheel is rotated the sensor will not rotate with the fixture. However, since the plane of the fixture is not necessarily parallel to the plane of the wheel the sensor may oscillate relative to the ground surface as the wheel is rotated-a condition known as "runout" which results in sensor reading errors. This is corrected by rotating the fixture to three separate rotative positions and recording the sensor readings at each such position. Circuitry is provided for determining the true alignment of the wheel by calculating the amount of the runout error at the final rotative position of the wheel and correcting the sensor reading by this amount.

14 Claims, 14 Drawing Figures

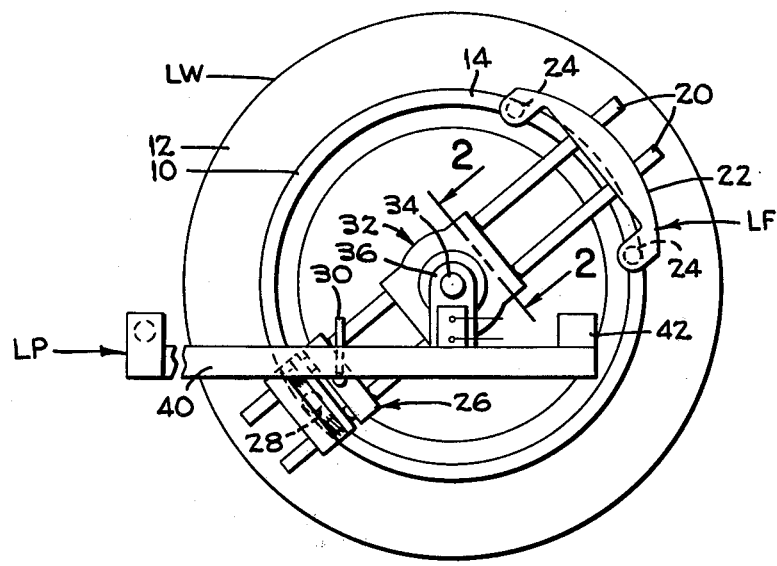
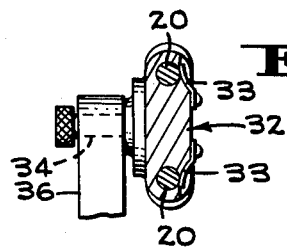
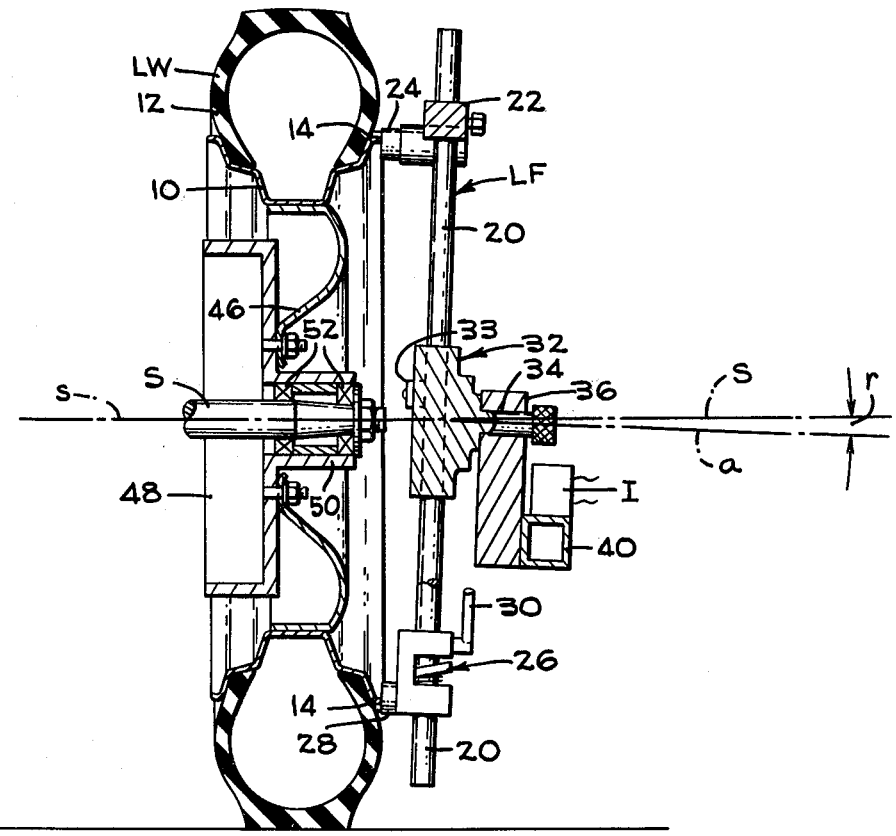

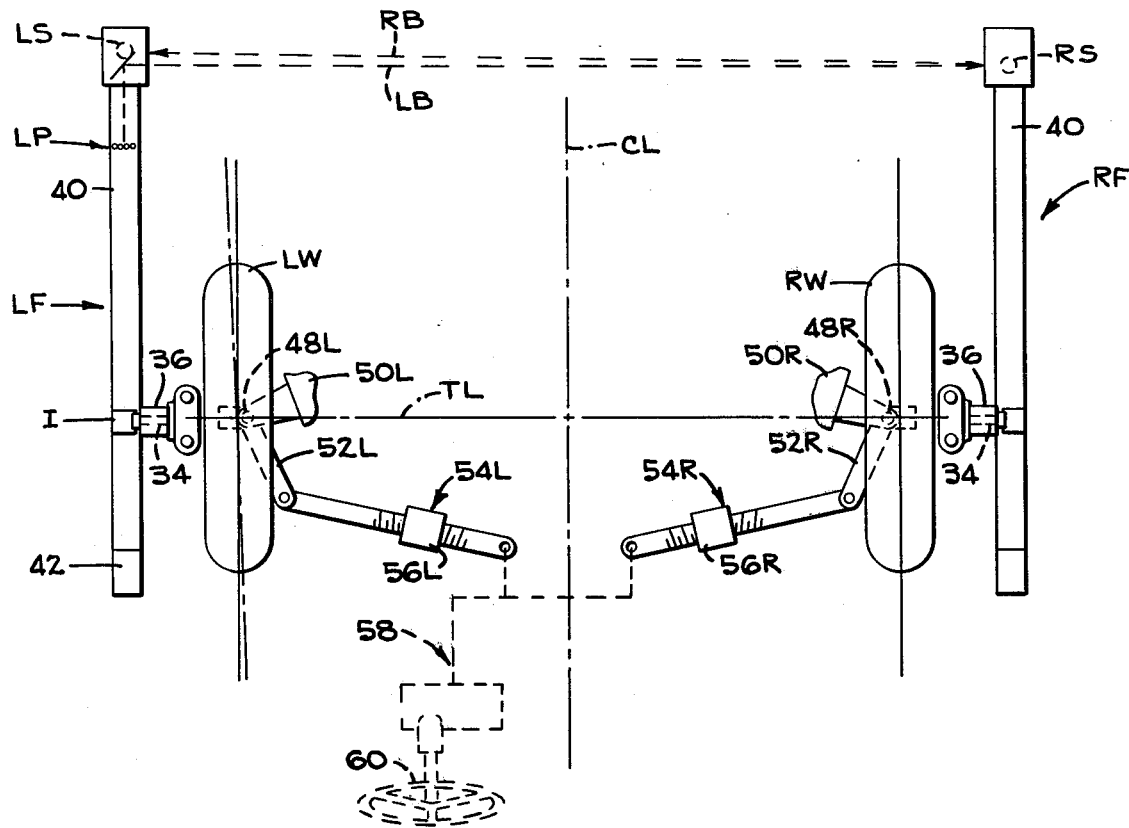
FIG_4
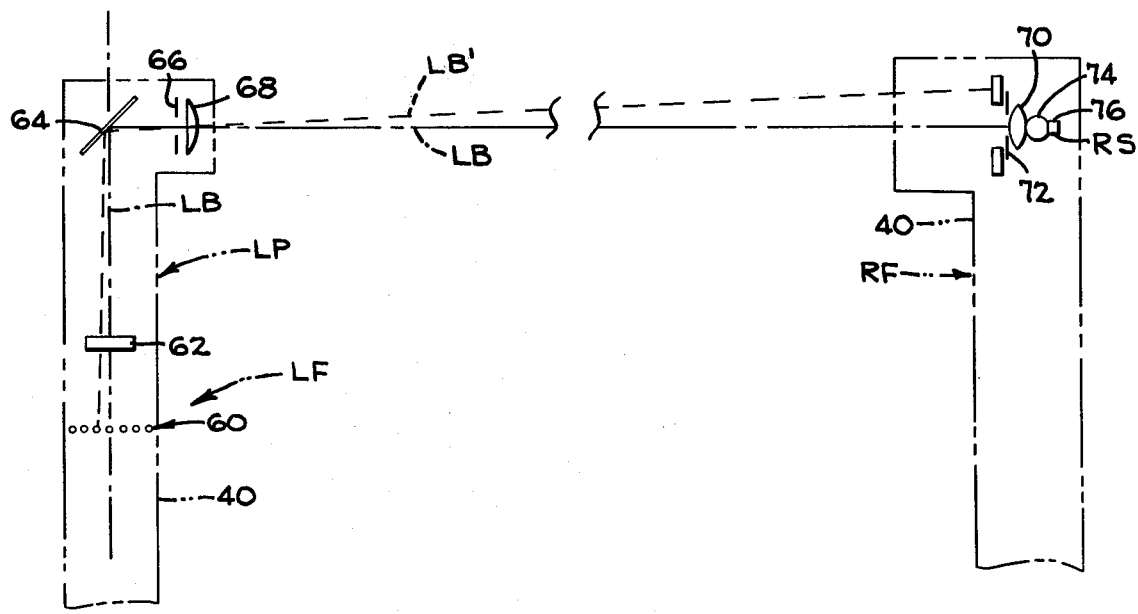
FIG_5

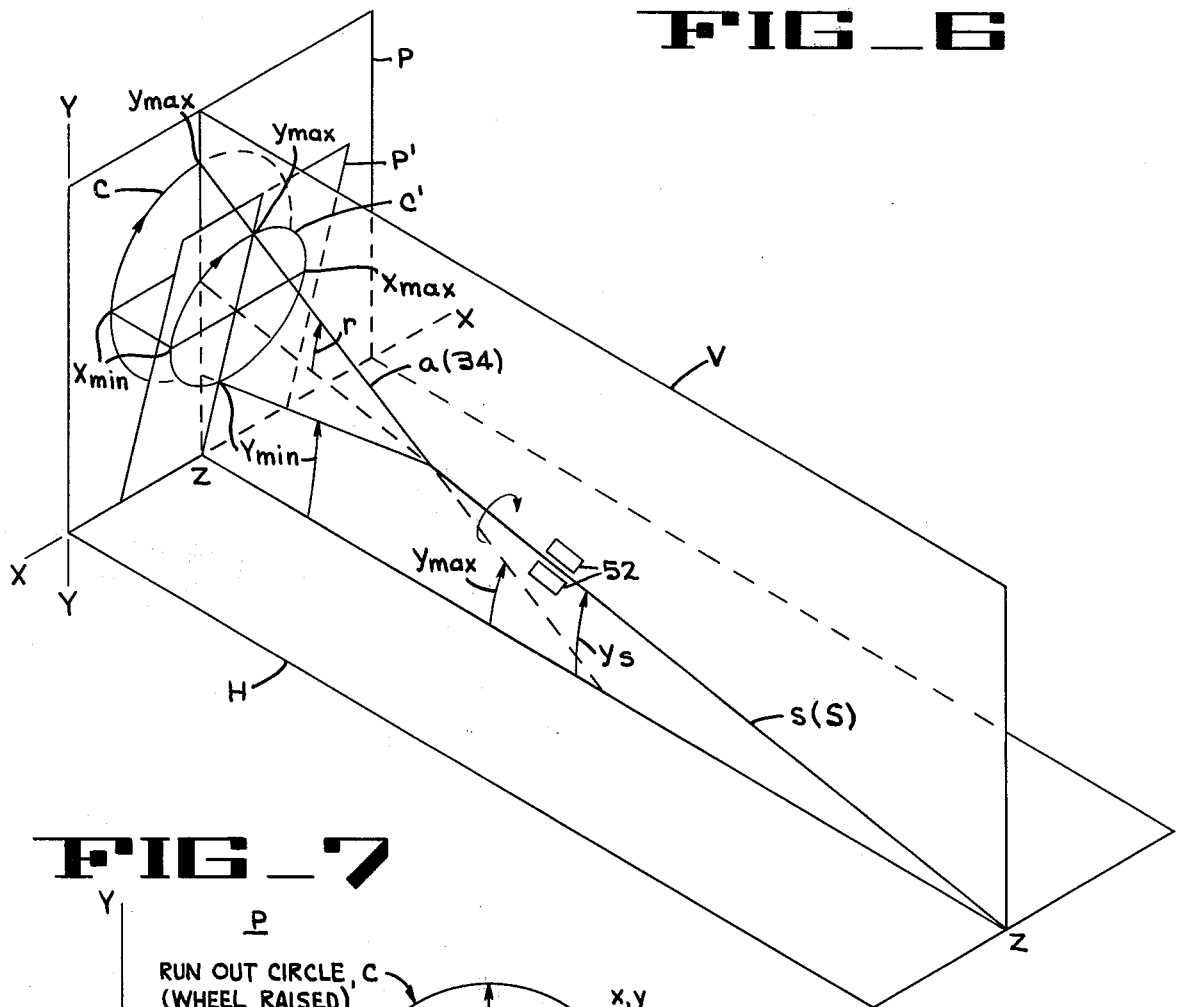
FIG_6
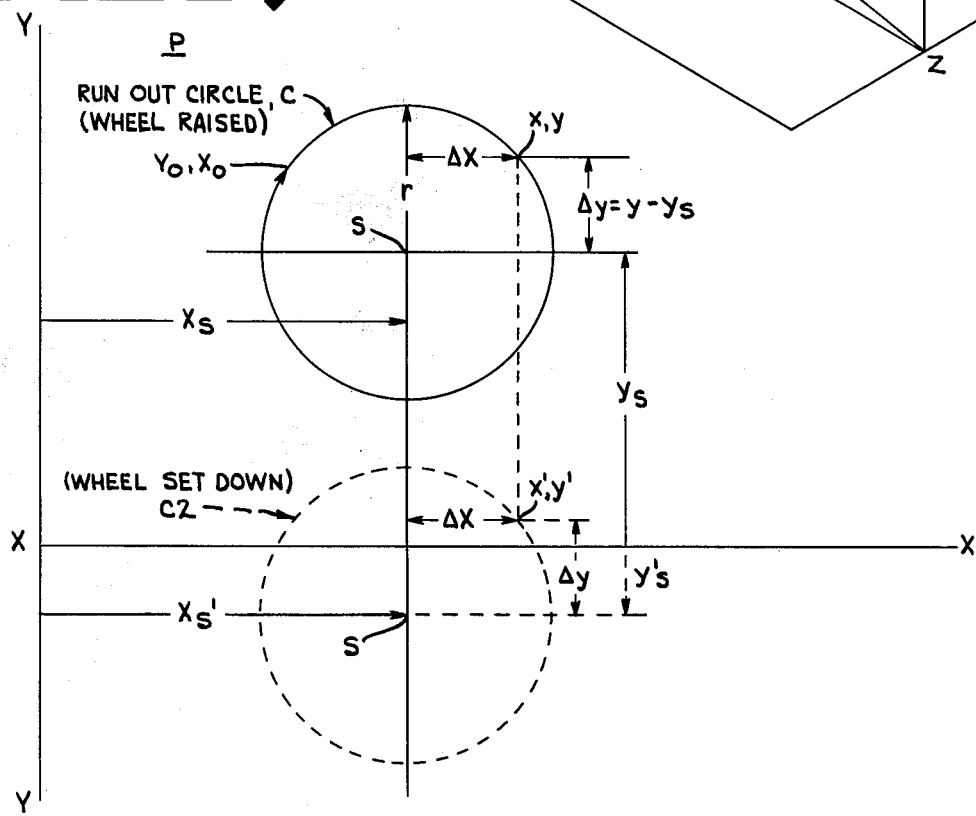
FIG_7

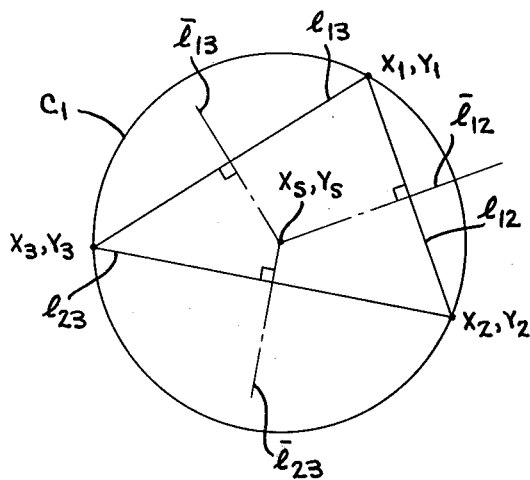
FIG_8
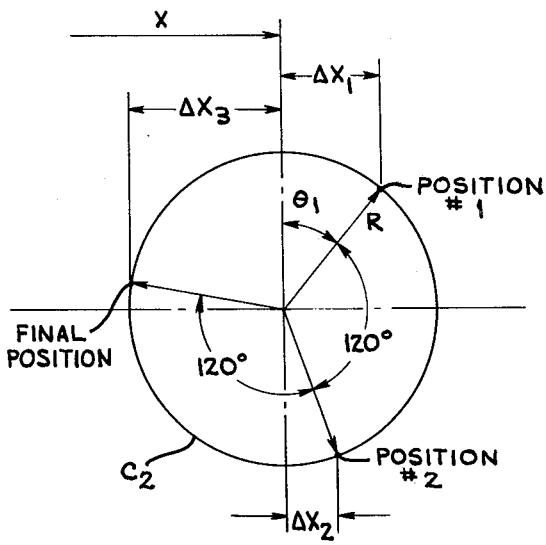
FIG_9
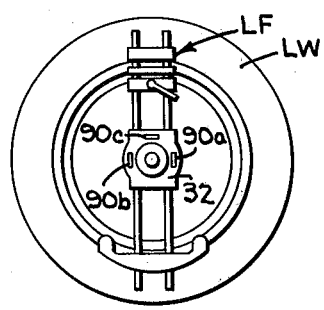
FIG_10C
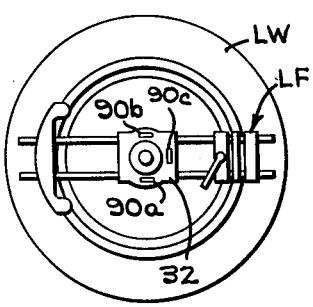
FIG_10A
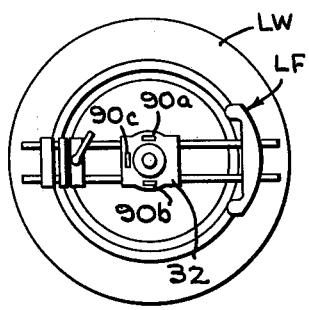
FIG_10B

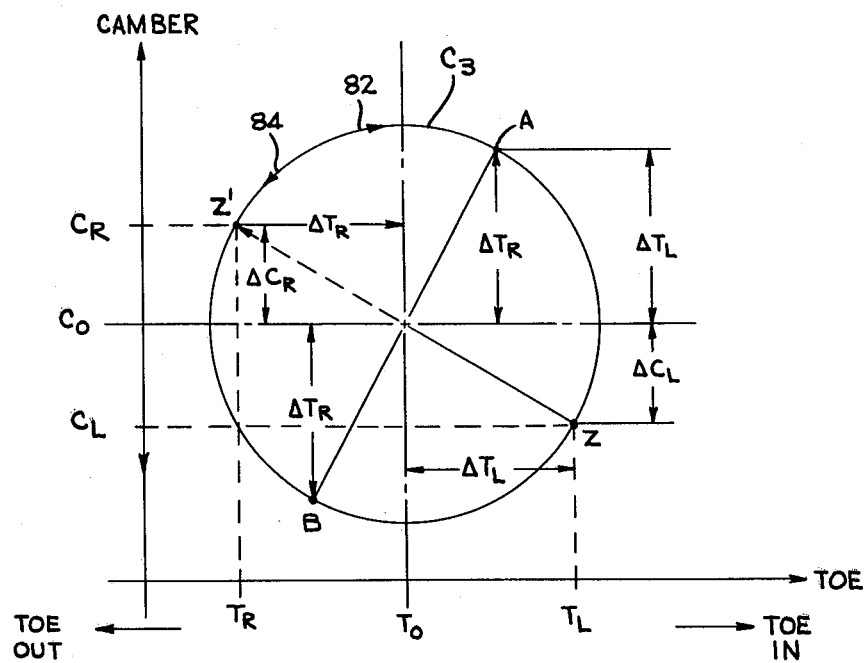
FIG_11
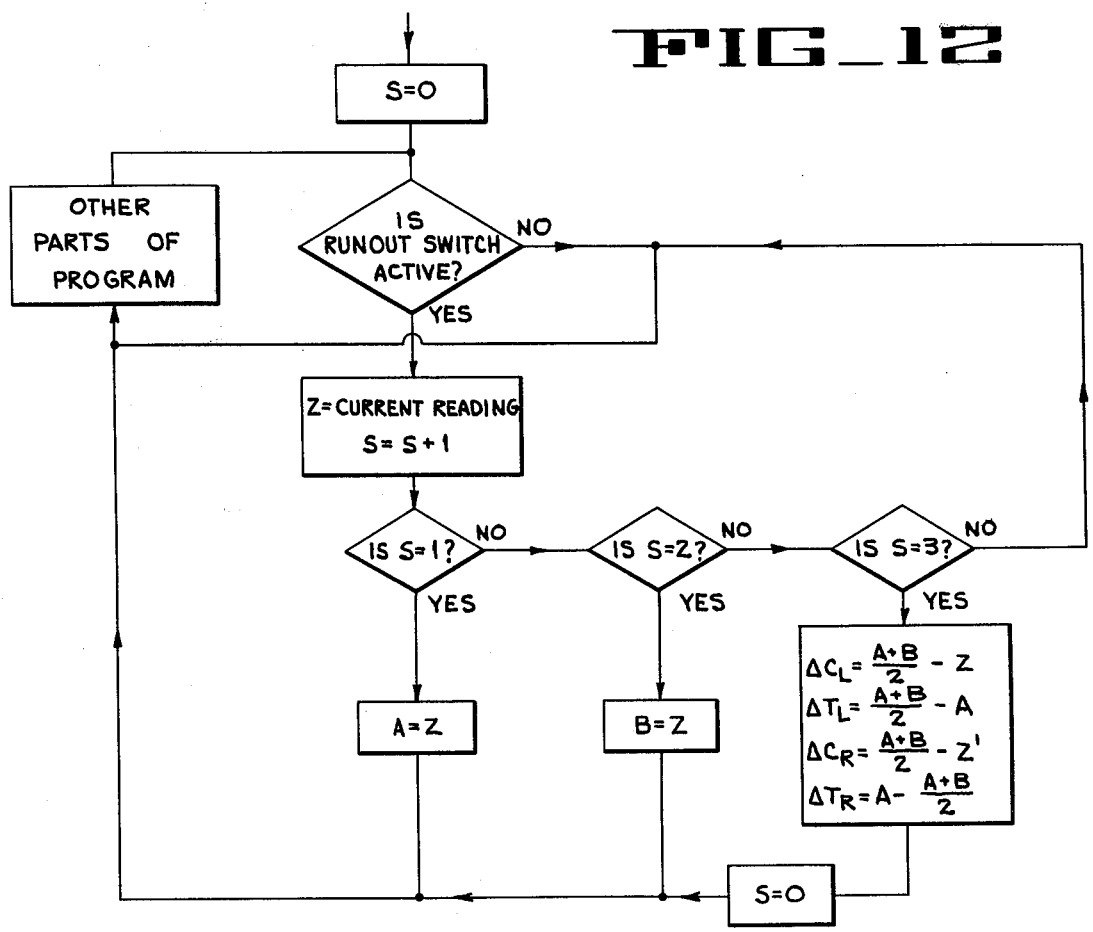
FIG_12

RUNOUT COMPENSATION IN VEHICLE WHEEL ALIGNMENT MEASURING APPARATUS

CROSS REFERENCE TO RELATED APPLICATION

The present application claims subject matter which is disclosed but not claimed in the co-pending application of Edmond R. Pelta, Ser. No. 836,658, filed Sept. 26, 1977 and entitled Method And Apparatus For Providing Runout Compensation.

BACKGROUND OF THE INVENTION

1. Field of the Invention

The present invention pertains to vehicle wheel alignment measurement, and more particularly, it pertains to the determination of and correction of a condition known as runout error in the sensor instrument which is mounted upon the wheel whose alignment is to be measured.

2. Description of the Prior Art

The procedure to which this invention relates is one wherein the wheels, typically the front wheels, of a vehicle have mounted thereon a fixture, or clamp, for use in mounting the wheel alignment measurement apparatus to the wheel so that its alignment can be accurately ascertained. The fixture commonly employed is clamped to the rim of the wheel by means of clamps mounted on opposite ends of a crossbar structure. Adjustably mounted on the crossbar structure is a slide, which can be considered to correspond to the hub of the wheel. In the embodiment of the typical fixture disclosed herein, the slide has a stub shaft projecting therefrom which theoretically represents an extension of the wheel spindle, or an axis closely parallel thereto. Pivotally mounted on the stub shaft is a counterweighted support, or bracket, which serves the purpose of mounting the angle measuring instruments, including sensors or detectors for providing information as to the inclination of the wheel axis of rotation in the horizontal plane (toe) and in the vertical plane (camber). Of course, the plane of rotation of the wheel is 90° to the axis of rotation of the wheel.

With such a prior art type of fixture, as will be shown in detail hereinafter, the sensors are supported on a bracket that is pendulously mounted on the aforesaid stub shaft of the slide so that if the wheel is jacked up to clear the ground and is rotated, the sensor support bracket does not rotate with the wheel. Of course, a reversed pendulous mounting structure could be provided wherein the sensor bracket has a stub shaft that is rotatably fitted into a socket in the slide, or simulated hub, of the fixture.

Ideally, the aforesaid stub shaft of the fixture, or its equivalent, should be parallel to the axis of rotation of the wheel, which corresponds to the spindle axis. Under these ideal conditions, the angular disposition of the stub shaft, or sensor mounting means, does not change in either the vertical or the horizontal plane as the wheel is rotated. Thus, the inclination angles measured in the vertical and horizontal planes would be the true measurements of the inclination of the wheel rotational axis in those planes. However, if the axis of the stub shaft is inclined from the axis of wheel rotation (the spindle axis) and hence is not perpendicular to the plane of rotation of the wheel, a condition known as "runout" occurs. Runout causes the sensor stub shaft axis to gyrate as the generatrix of a cone and thus produces an angular inclination of the stub shaft axis with respect to a reference plane which varies from the true inclination of the spindle axis with respect to that plane as the wheel rotates. Such angular deviation in the vertical plane is referred to as a runout error in camber, and a corresponding angular deviation of the stub shaft axis in the horizontal plane is referred to as a runout error in toe. Runout can occur either because the fixture is not clamped onto the wheel rim so that the axis of the stub shaft (or equivalent) is parallel to the spindle axis, or, because the wheel rim in itself is not in a plane perpendicular to its axis of rotation. Either or both of these conditions will produce the runout error which leads to erroneous camber and toe readings from the sensor instruments.

U.S. Pat. No. 3,892,042 to Senften, issued July 1, 1975, recognizes that runout in the sensor instruments will introduce errors in the measurement of the toe and camber angles of a vehicle wheel when employing a fixture of the general type previously mentioned. The solution proposed by the aforesaid Senften patent requires the rotation of the wheel into two predetermined positions which are exactly 180° apart, coupled with the generation of separate and discrete inclination signals at each of said two rotative positions. Inclination measurements are made for both toe and camber, but in either plane such measurements must be obtained at each of the two wheel rotative positions which are exactly 180° apart. To obtain the true inclination of the axis of rotation of the wheel in each of the desired planes, Senften adds the two discrete and individual inclination readings taken exactly 180° apart and divides them by two. The result of this operation cancels out the effect of runout and hence gives the true inclination of the wheel axis relative to the desired plane.

SUMMARY OF THE INVENTION

In determining and correcting for runout error with the method and apparatus of the present invention, the vehicle wheel is rotated into three distinctive rotative positions and the sensor (or sensors) mounted on the alignment measuring instrument for determining the wheel orientation are operated to record wheel inclination information at each of such rotative positions. Then, means is provided for automatically calculating the runout error in the third, or final, wheel position based upon the information recorded from the sensor at such position plus that information recorded at the other two positions.

In its simplest version, the invention can be realized by rotating the wheel into three rotative positions uniformly spaced exactly 120° apart and recording information from the alignment sensor (or sensors) at each of such positions. A simplified electronic circuit can then be used to provide the wheel alignment error due to instrument runout in the final rotative position of the wheel. However, a more general scheme, requiring more complex circuitry, permits the wheel to be rotated into any three arbitrarily chosen rotative positions with no measurements of the rotative positions being made. This scheme has the advantage that it does not require the operator to accurately position the wheel in any particular predetermined rotative position and hence he can work very rapidly.

The preferred method of utilizing the system of the present invention, however, is one wherein two of the three rotative positions of the wheel are spaced 180° apart and the third rotative position is located 90° from the first two positions. By choosing such relatively rotated positions of the wheel it is possible to use a sensor which records alignment relative to only one plane (for example, the camber plane) and yet to determine and correct for the runout error in two mutually orthogonal planes (for example, the camber and toe planes).

BRIEF DESCRIPTION OF THE DRAWINGS

FIG. 1 is a side elevation of a left front wheel of a vehicle with a fixture clamped to the rim mounting both toe and camber sensors.

FIG. 2 is an enlarged section through the fixture slide, taken on line 2—2 of FIG. 1.

FIG. 3 is a vertical front view section through the front wheel showing the fixture clamped thereon with the pendulous sensor mounting bar being shown in section.

FIG. 4 is a schematic plan view of the front end of an automobile showing one example of a toe angle measuring system, namely, a cross-toe system.

FIG. 5 is a diagrammatic plan view of a toe measuring system for the left front wheel.

FIG. 6 is a diagram in perspective illustrating the generation of a runout circle.

FIG. 7 is a diagram illustrating the general principles for obtaining runout corrections and corrected camber and toe angles, using the runout circle as the basis for illustrative explanation.

FIG. 8 is a diagram, using the runout circle as the basis for explanation, which illustrates a first embodiment of the invention in which three arbitrarily chosen rotative positions of the wheel can be used to determine the runout error.

FIG. 9 is a diagram, using the runout circle as the basis for illustrative explanation, which describes a second embodiment of the invention wherein three rotative positions of the wheel spaced 120° apart are utilized for taking the sensor measurements to determine runout error.

FIGS. 10A, 10B and 10C are diagrammatic illustrations of the three rotative positions of the wheel where the sensor measurements are taken in order to provide for the determination of and the elimination of runout error in a third, and preferred, embodiment of the invention.

FIG. 11 is a diagram, using the runout circle as the basis for explanation, which illustrates the manner in which runout is determined when the three rotative positions of the wheel shown in FIGS. 10A, 10B and 10C are used to provide the sensor measurements.

FIG. 12 is a flow chart of a computer program which can be used with the embodiment of the invention diagrammatically illustrated in FIGS. 10A–10C and 11.

DESCRIPTION OF THE PREFERRED EMBODIMENTS

To illustrate the principles of the present invention, a specific fixture mounting a pair of specific angle, or wheel orientation, sensing instruments is shown. It will be appreciated, however, that the specific hardware and instruments shown form no part of the present invention and are disclosed for illustrative purposes only so that the principles underlying the method and apparatus of the present invention can be more readily understood.

Referring now to FIGS. 1, 2 and 3, a wheel alignment measuring installation for a left front wheel LW is illustrated. The wheel includes the usual rim 10 and tire 12 retained by rim side flanges 14. A left fixture LF is mounted on the rim. The details of the fixture and its clamping structure are not critical to the present invention (as mentioned hereinbefore), and the clamping structure shown herein resembles that shown in U.S. Pat. No. 2,457,502 to Holmes, issued July 5, 1949 and incorporated herein by reference.

The fixture includes slide rods 20 mounting an adjustably positioned clamp 22 adjacent one pair of ends thereof. The clamp 22 mounts spaced clamp jaws 24. The other ends of the slide rods 20 mount a two-piece, quick acting clamp 26, one portion of which includes a single jaw 28 for engaging the rim flange. The clamp 26 is operated by a clamp handle 30, as disclosed in detail in the aforesaid Holmes patent.

In order to mount a sensor support member, the fixture includes a slide 32. The slide 32 is manually positioned along the rods 20, and, as shown in FIG. 2, its position is maintained by friction clips 33. The slide 32 has a projecting stub shaft 34, and upon installation the slide is positioned on the rods 20 so that the stub shaft 34 is in substantial alignment with the axis "s" of wheel rotation (FIG. 3), which axis corresponds with the axis of the wheel spindle S.

In order to mount the sensor elements so that they do not rotate with the wheel during rotation of the wheel, a sensor support bracket 36 is pivotally mounted on the stub shaft 34 and depends therefrom. The lower end of the bracket 36 mounts a longitudinal cross bar 40. In order to measure inclination of the stub shaft 34 in the vertical plane, an inclinometer I is mounted on the cross bar 40 beneath the stub shaft 34. Details of the inclinometer are not critical to the present invention and an inclinometer such as that shown in the aforementioned U.S. Pat. No. 3,892,042 to Senften can be employed. Reference to such prior patent may be had for details of the inclinometer structure.

In order to measure inclination of the stub shaft 34 in the horizontal plane (toe) the front end of the cross bar 40 is, in the present embodiment, provided with a left projector LP which projects a left beam LB (FIG. 4) to a right sensor RS mounted on the right wheel RW. A left sensor LS is also mounted at the front end of the left wheel bar 40 for receiving a right beam RB (FIG. 4) from a projector (not shown) which is like the projector LP but is located on the fixture RF mounted on the right wheel RW. The sensor support bar 40 is counterbalanced so that it maintains its horizontal position by means of a counterbalance weight 42 (FIG. 1). The fixture RF for the right wheel RW is identical to the fixture LF shown in FIG. 1 except that the toe sensors and projectors of the fixture RF face oppositely to the corresponding elements of the left fixture LF. Both fixtures have support bars 40 mounted on depending brackets 35, as previously described, which brackets are pivotally supported by the fixture stub shafts 34, as described.

As seen in FIG. 3 (front view), the left wheel LW, in addition to the usual rim 10, previously described, has a wheel body 46, the mounting flange of which is bolted to a brake drum 48 having a hub 50 supported by the usual bearings 52 for the front wheel spindle S. The axis of wheel rotation is indicated at "s" in FIG. 3, but the rim flange 14 may not be perpendicular to the wheel rotational axis "s", or, even if the rim flange does run true, the fixture LF may be inclined relative to a plane perpendicular to the axis "s" of wheel rotation (as shown in FIG. 3). In either case, the axis "a" of stub shaft 34 may be inclined from the axis "s" of wheel rotation by a small angle illustrated as "r". For simplicity of illustration, the inclination angle "r", which defines the runout angle, is shown as having its maximum value in the vertical plane although, as will be seen, the position of the maximum runout angle, or runout error, rotates as the wheel rotates because the stub shaft axis "a" gyrates about the wheel axis "s".

Although the instrumentation for measuring the inclination (in the horizontal plane) of the wheel rotation axis "s" relative to a reference line connecting the wheels (toe angle) is not critical to the present invention, the cross-toe measurement system shown in the copending application of Andrew K. Chang, Ser. No. 834,636, filed Sept. 16, 1977, is partially illustrated herein, and the disclosure thereof is incorporated herein by reference.

Referring to the plan diagram of FIG. 4, which shows a cross-toe measurement system of the type mentioned installed on a vehicle, it will be seen that the left and right wheels LW, RW have the usual ball joints or king pins 48L, 48R, which are supported by the usual suspensions, such as A-frame structures 50L, 50R. The wheels have the usual steering arms 52L, 52R connected to conventional drag links 54L, 54R, and the toe angles of the wheels can be individually adjusted by threaded adjusting sleeves 56L, 56R. The drag links are operated by a conventional steering mechanism, indicated at 58—and it is customary to have the mechanism adjusted to that when one spoke of a three spoke steering wheel 60 is vertical, or the spokes of a two spoke wheel are horizontal, the front wheels should be at the factory-set toe angle relative to the longitudinal centerline CL of the vehicle or relative to a transverse reference line TL that is perpendicular to the centerline and connects the wheel pivot axes at 48L, 48R.

Toe projector and sensor units for the left wheel LW are shown in greater detail in the diagram of FIG. 5, which corresponds to the diagram of FIG. 8 of the aforesaid copending Chang application Ser. No. 834,636. For measuring toe of the left wheel LW, the left fixture LF includes a linear array 60 of light emitting diodes (LEDs). As explained in the aforesaid copending Chang application, these diodes are sequentially energized, and an electronic system is provided for determining which diode is energized at any given time. With reference to FIG. 5, when the center LED of the array 60 is energized, a beam of light indicated by a broken line LB (only the principal beam is shown) passes through a cylindrical lens 62, is turned 90° by a mirror 64, then passes through the center portion of a mask 66 and is focused by a lens 68 onto a condensing lens 70 provided in the toe sensing structure for the right wheel fixture RF. A mask 72 is also provided ahead of the condensing lens 70. The condensing lens 70 transmits the beam LB to a spherical lens 74 the rear face of which is flattened slightly to mount a photo-transistor 76, comprising the right sensor RS. In the diagram of FIG. 5, when the center LED of the array 60 is energized, that fact will be signaled to the computing instrumentation by photo-transistor 76 at the opposite wheel.

Also indicated in FIG. 5 is a light beam LB' (shown in dashed lines) which emanates from a different LED in the array 60. This beam diverges from the beam LB and does not strike the condensing lens 70, and hence, no signal from the photo-transistor 76 is provided. Thus, as the angular disposition of the bar 40 on the left fixture LF changes in the horizontal plane (toe), the position of the fixture (and hence the toe angle of the associated left wheel) is determined by ascertaining which of the diodes in the array 60 of the LEDs must be illuminated to generate a signal in the photo-transistor 76. This system of measuring toe angle is explained in detail in the aforesaid copending application of Chang and does not require further elaboration for purposes of explanation of the runout correction system of the present invention. It is to be understood that other toe sensor mechanisms, mirror system, etc. can be employed so long as they provide signals which can be used to indicate the position of the axis "a" of the fixture stub shaft 34 in the horizontal (or toe) plane or an equivalent horizontal plane measurement indicative of the toe angle of the wheel.

Although the runout error can be explained by the use of a sine curve, as in the aforesaid Senften patent, applicant prefers to illustrate the runout error and the correction therefor in both the toe and camber planes by utilizing a representation known as "the runout circle".

Referring to FIG. 6, generation of a runout circle is illustrated. It is to be understood that this is a purely imaginary circle (i.e., not physically defined in the system of the present invention) but that it is useful in illustrating and calculating runout errors and the corrections therefor.

Shown in the diagram of FIG. 6 is a horizontal plane H, which is the plane in which wheel toe is measured. Perpendicular to the horizontal plane H and intersecting it along a horizontal axis Z—Z is a vertical plane V, the plane illustrated passing through the wheel rotation axis "s" of the wheel spindle S as the wheel rotates in its bearings 52 (FIG. 3). Runout in camber is measured as an angle in the vertical plane V.

Also shown in FIG. 6 is a vertical plane P which intersects the horizontal plane H along a horizontal reference line X—X, and which is perpendicular to the axis Z—Z. The plane P contains an arbitrary vertical reference line Y—Y. A plane P' also intersects the line X—X and is perpendicular to the axis "s" of wheel rotation.

When the fixture axis "a" of the fixture mounting stub shaft 34 is at an angle "r" to the axis "s" of wheel rotation, the condition known as runout occurs, and the angle "r" will be referred to as the total (or maximum) runout error. If the axis "a" can be considered to extend and intersect the planes P and P' as the wheel is turned, this intersection will form an imaginary circle C' in the plane P' which is the true runout circle. Also, the intersection of the fixture axis "a" with the vertical plane P as the wheel rotates forms another imaginary runout "circle" C in the plane P, which can also be considered to represent "the runout circle". This runout circle C represents the runout circle which is, in effect, measured with the sensors aforedescribed since the inclinometer I references all camber angle measurements with respect to the true vertical plane. In principle, however, if the vertical plane P is not perpendicular to the axis "s", the runout "circle" C in the vertical plane P would be slightly elliptical; but in practice, the differences between the shape of the runout circle C' in the plane P' and the runout circle C are smaller than the normal reading errors that may arise in the measurement of the angles in the toe and camber planes. Hence, the circles C and C' can be considered to be interchangeable. In the diagram of FIG. 6, the inclination of the fixture axis "a" from the wheel rotation axis "s" is indicated as an angle "r", which is the total (maximum) runout angle and which can also be considered to be a function of the radius of both runout circles.

As indicated in FIG. 6, as the wheel is rotated, the intersection of the fixture axis "a" in vertical plane V with the plane P' becomes a maximum inclination angle $y_{max}$ at the top of the runout circle C' and becomes a minimum inclination angle $y_{min}$ at the bottom thereof. The same remarks apply to runout circle C in plane P. Similarly, as shown in FIG. 6, as the wheel is rotated, the intersection of the fixture axis "a" with the plane P' in a plane parallel to the horizontal plane H (toe) becomes a point $x_{max}$ of maximum inclination from arbitrary reference line Y—Y at the right of the circle C' and becomes a point $x_{min}$ of minimum inclination at the left of the circle. Again, the same remarks apply to circle C in plane P. Thus, for runout circle C, the position of the runout circle as a whole varies in accordance with the position of the rotational axis "s" of the wheel spindle (the center of the runout circle) in relation to the arbitrary reference lines X—X and Y—Y. At any point on the runout circle, the sensors can be considered to measure the inclination of axis "a" in the vertical plane as displacement from the horizontal reference line X—X and its inclination in the horizontal plane as displacement from the vertical reference line Y—Y.

FIG. 7 is a diagram showing how camber and toe angles and their appropriate runout corrections can be illustrated using the previously described convention of an imaginary runout circle. This diagram shows how measurements x, y (toe, camber) made at a stopped rotative position of the wheel are related to the true wheel orientation. Assume that the wheel to be checked, say the left front wheel, has been jacked up so that it can be rotated to obtain inclination angle measurements from the inclinometer I and toe sensor RS. In practice, the opposite or right front wheel may be jacked up at the same time or subsequently for measurements on that wheel. However, the diagram of FIG. 7 pertains only to measurements made on one wheel.

In measurements for camber, the signals from the inclinometer I, representing inclination of the fixture axis "a" in the vertical plane, can be represented in FIG. 7 as a vertical displacement of points on the runout circle from the horizontal reference line X—X, that is, displacement along the vertical reference line Y—Y. As the wheel is rotated from any random starting position, the axis "a" of the fixture hub 34 will describe the runout circle C in the plane P, and after the wheel has stopped the axis "a" will be at the point x, y on the runout circle. When the wheel is stopped, the inclinometer will indicate an inclination angle in the vertical plane which can be represented as the position of point y on the runout circle C (FIG. 7), with the wheel raised. The inclination angle y, illustrated in FIG. 7, differs by a runout error angle $\Delta y$ from the inclination angle $y_s$ of the wheel rotational axis "s". It can be seen from FIG. 7 that $y_s$ is the true inclination of the wheel rotation axis "s". The inclination $y_s$ thus defines the center of the runout circle in the y direction, and the three-point measuring system for obtaining this value will be explained presently. It can also be seen from FIG. 7 that the runout error correction in camber, $\Delta y$, is equal to the measured inclination angle y at the stopped wheel position minus $y_s$. FIG. 7 also shows in dashed lines the same runout circle, now entitled C2, when the wheel has been set back down to the ground. The points x, y will now be at new positions x', y'. Thus, with the wheel down, the inclinometer will measure a final inclination angle y' of the axis "a" in the vertical plane, but the value of the runout correction $\Delta y$ will be unchanged, so long as the wheel is not rotated as it is set down. Thus, when the wheel is set down true camber $y_s'$ will equal the final measured inclination angle y' minus $\Delta y$.

The toe in or toe out angle of the wheel in the horizontal or toe plane is measured by instrumentation which can provide inclination angle signals corresponding to wheel toe, a cross-toe measurement system having been previously described in connection with FIGS. 4 and 5. As pointed out hereinbefore, the principles of the system of the present invention are independent of the instrumentation. The runout error $\Delta x$ (FIG. 7) in the toe plane is computed, as in the case of camber, obtaining inclination angle $x_s$, which defines the center of the runout circle, by the three-point measuring scheme to be explained presently, and subtracting $x_s$ from the inclination angle x measured when the wheel is stopped. To obtain the toe angle $x_s'$, corrected for runout when the wheel is set down, the runout error $\Delta x$ is subtracted from a final inclination angle x'. Thus, it will be seen that determining runout error and correcting for it is a matter of defining the center $x_s$, $y_s$ of the runout circle and relating this information to the sensor signals obtained at the final rotative position of the wheel.

The problem thus becomes one of obtaining camber angle and toe angle measurements at various rotative positions of the wheel when the wheel is raised so as to define the runout circle C (FIG. 7). Once the runout circle is defined the center $x_s$, $y_s$ can be determined, and from this, the runout error at the final wheel position. In accordance with the principles of the present invention, the wheel is rotated to three different rotative positions (including the final wheel position), and sensor measurements are made at each of these positions. Then, by various mathematical methods, depending upon the mode whereby the three rotative positions are chosen, the center of the circle can be readily determined, and hence, the runout error at the final rotative position of the wheel.

The basic three-point runout measuring scheme is diagrammatically illustrated in FIG. 8 which shows a runout circle $C_1$ similar to the runout circle C of FIG. 7. With the wheel raised up off the ground and with a fixture and pair of sensors mounted on the wheel, in the manner shown in FIGS. 1–5, wheel alignment is first measured at an arbitrarily chosen rotative position of the wheel and, by pushing an appropriate switch, the toe and camber signals from the sensors are obtained at such rotative position, such signals being indicated as $x_1$ and $y_1$, respectively, in the diagram of FIG. 8. The signals $x_1$, $y_1$ are then stored by appropriate means, e.g., binary registers. The wheel is then rotated an arbitrary distance to a second rotative position wherein the measuring process is repeated to obtain inclination signals $x_2$ and $y_2$, which signals are also stored. The wheel is again rotated to a final, arbitrarily chosen, rotative position wherein final angular inclination signals $x_3$ and $y_3$ are obtained. Then, with the three camber measurements ($y_1$, $y_2$, $y_3$) and the three toe measurements ($x_1$, $x_2$, $x_3$) available, the runout corrected camber and toe measurements for the wheel (i.e., the center of the runout circle $x_s$, $y_s$) are computed according to the following formulae:

$$y_s = \frac{(y_2^2 - y_1^2 + x_2^2 - x_1^2)(x_3 - x_2) - (y_3^2 - y_2^2 + x_3^2 - x_2^2)(x_2 - x_1)}{2(y_2 - y_1)(x_3 - x_2) - 2(x_2 - x_1)(y_3 - y_2)} \quad (1)$$

$$x_s = \frac{(y_3^2 - y_2^2 + x_3^2 - x_2^2)(y_2 - y_1) - (y_2^2 - y_1^2 + x_2^2 - x_1^2)(y_3 - y_2)}{2(y_2 - y_1)(x_3 - x_2) - 2(x_2 - x_1)(y_3 - y_2)} \quad (2)$$

The computation for the runout corrected toe and camber measurements $x_s$, $y_s$ may be obtained with conventional hard-wired logic circuitry or it may be carried out by using a microprocessor and conventional programming techniques well within the skill of those skilled in this particular art. Once having obtained the runout corrected camber and toe values $y_s$ and $x_s$, such values can then be subtracted from the final inclination signal values $y_3$, $x_3$ to provide appropriate runout error signals at the final rotative position of the wheel which errors will be thereafter automatically taken into account in making further wheel alignment measurements during the actual wheel alignment procedure carried out in accordance with conventional alignment techniques. After the runout errors at $y_3$, $x_3$ are determined the wheel is set back down on the ground without changing the relative rotative position thereof in preparation for said conventional alignment procedure.

The derivative of the foregoing formulas (1) and (2) can be seen when it is considered that the position of an arbitrary point x, y on the line $l_{12}$ (FIG. 8) can be defined by the following relationship:

$$(x_2 - x_1)(y - y_1) - (y_2 - y_1)(x - x_1) = 0$$

Similarly, the equations for arbitrary points x, y on the lines $l_{23}$ and $l_{13}$ are respectively:

$$(x_3 - x_2)(y - y_2) - (y_3 - y_2)(x - x_2) = 0$$

$$(x_1 - x_3)(y - y_3) - (y_1 - y_3)(x - x_3) = 0$$

As indicated in the diagram of FIG. 8, lines $\bar{l}_{13}$, $\bar{l}_{12}$, and $\bar{l}_{23}$ are perpendicular bisectors of the lines $l_{13}$, $l_{12}$ and $l_{23}$, respectively. These perpendicular bisectors intersect at the center of the runout circle $x_s$, $y_s$. Keeping in mind that the slope of, for example, the line $\bar{l}_{23}$ is the negative inverse of the slope of the line $l_{23}$, equations for arbitrary points x, y on each of the perpendicular bisector lines can be defined by the following equations:

$$\bar{l}_{12}: (y_2 - y_1)\left[y - \frac{(y_1 + y_2)}{2}\right] + (x_2 - x_1)\left[x - \frac{(x_1 + x_2)}{2}\right] = 0$$

$$\bar{l}_{23}: (y_3 - y_2)\left[y - \frac{(y_2 + y_3)}{2}\right] + (x_3 - x_2)\left[x - \frac{(x_2 + x_3)}{2}\right] = 0$$

$$\bar{l}_{13}: (y_1 - y_3)\left[y - \frac{(y_3 + y_1)}{2}\right] + (x_1 - x_3)\left[x - \frac{(x_3 + x_1)}{2}\right] = 0$$

Since the center $x_s$, $y_s$ of the runout circle is determined by the intersection of any two perpendicular bisectors, the intersection of lines $\bar{l}_{12}$ and $\bar{l}_{23}$, for example, requires that:

$$(y_2 - y_1) y_s + (x_2 - x_1) x_s = \tfrac{1}{2}(y_2^2 - y_1^2 + x_2^2 - x_1^2) \quad (3)$$

$$(y_3 - y_2) y_s + (x_3 - x_2) x_s = \tfrac{1}{2}(y_3^2 - y_2^2 + x_3^2 - x_2^2) \quad (4)$$

By simultaneous solution of equations (3) and (4) above, the solution for $y_s$ and $x_s$ is attained as shown in equations (1) and (2) hereinbefore.

While the aforedescribed three-point measurement method has the advantage that no particular predetermined rotative wheel positions are required, it has the disadvantage that the formulae (1) and (2) are rather complex and require a significant amount of circuitry or substantial programming space on a microprocessor. An electronically simplified version of the three-point runout measuring technique is diagrammatically illustrated in FIG. 9 which shows a runout circle $C_2$ similar to the previously described runout circles C and $C_1$. In the method illustrated by the diagram of FIG. 9, the wheel is first rotated to an identifiable rotative position indicated as position No. 1. This position may be identified, for example, by a bubble level device placed upon the slide 32 of the fixture LF which is mounted on the wheel. A switch is operated when the wheel is at position No. 1 to store the signals from the camber and toe sensor instruments at that point. The wheel is then rotated exactly 120° from position No. 1 to position No. 2 (which again can be indicated to the operator by a second bubble level means on the fixture), and a second set of camber and toe sensor signals is obtained. A switch is again operated to store these signals. The wheel is then rotated to a third position exactly 240° from position No. 1 which is indicated, in FIG. 9, as the final position of the wheel. A reading of the camber and toe sensors is again obtained. A switch is then operated to separately add the camber and toe signals obtained in the first two positions to the signals at the third position, divide each of the totals by three, and subtract the obtained average values of toe and camber from the corresponding signals at the third and final wheel position. The resultant values are stored as the toe and camber runout errors at the final wheel position. With regard to the diagram of FIG. 9, which illustrates only the toe sensor signals, the value X represents the average (or true) toe value whereas the value $\Delta X_3$ represents the runout error in the final rotative position of the wheel, which is the error signal that is stored and subsequently used in all further toe measurements during the actual alignment of the wheel.

The truth of the foregoing mathematical computation for determining the toe and camber runout errors can be shown mathematically with relationship to the runout circle of $C_2$ of FIG. 9 wherein X equals the true angular position of the axis "s" (FIG. 6) in the toe plane; $X + \Delta X_1$ equals the toe sensor reading at the first rotative position of the wheel; $X + \Delta X_2$ equals the toe sensor reading at the second rotative position of the wheel; $X + \Delta X_3$ equals the toe sensor reading at the third rotative position of the wheel, and R equals the error vector (maximum runout error) at the randomly chosen angle, $\theta_1$, at the first rotative position of the wheel. Thus:

$$\Delta X_1 = R \sin \theta$$

$$\Delta X_2 = R (\sin \theta + 120°)$$
$$= R (\sin \theta \cos 120° + \sin 120° \cos \theta)$$
$$= R \left(-\frac{\sin \theta}{2} + \frac{\sqrt{3} \cos \theta}{2}\right)$$
$$\Delta X_3 = R (\sin \theta + 240°)$$
$$= R (\sin \theta \cos 240° + \sin 240° \cos \theta)$$
$$= R \left(-\frac{\sin \theta}{2} - \frac{\sqrt{3} \cos \theta}{2}\right)$$
$$\frac{(X + \Delta X_1) + (X + \Delta X_2) + (X + \Delta X_3)}{3} =$$
$$\frac{3X + R\sin\theta - 2R\frac{\sin\theta}{2} + \frac{\sqrt{3R}\cos\theta}{2} - \frac{\sqrt{3R}\cos\theta}{2}}{3} = X$$

Thus, for finding the runout error in any one plane, it is only necessary to add the three obtained sensor readings for that plane, divide the sum by three to get the true (corrected) sensor reading, and then subtract from the quotient the sensor reading at the final wheel position. It is not absolutely necessary, however, to ever determine the true sensor reading since the sensor runout error at the final rotative position of the wheel is all that is desired. This runout error $\Delta X_3$ can be defined as the sensor reading at the first rotative position of the wheel minus the sensor reading at the third rotative position of the wheel plus the sensor reading of the second rotative position of the wheel minus the sensor reading of the third rotative position of the wheel, all divided by three. A practical method of thereby determining and correcting for runout error might include the following steps, which can readily be programmed in a conventional microprocessor:

(1) Elevate the wheel with the alignment sensor mounted thereon.
(2) Store the output of the sensor at the first (arbitrarily chosen) rotative position of the wheel in a register #1.
(3) Rotate the wheel 120° to a second rotative position.
(4) Store the output of the sensor in a register #2.
(5) Rotate the wheel 120° more to a third rotative position.
(6) Subtract the final sensor reading from the contents of each of register #1 and register #2.
(7) Lower the wheel to the ground without changing its third rotative position.
(8) Add the contents of register #2 to the contents of register #1 and clear register #2.
(9) Divide the contents of register #1 by three and store the quotient in register #2. The value in register #2 is then the runout error at the final wheel position, and this value will always be added to any sensor reading obtained during subsequent realignment procedures on the wheel.

The preferred method of using the three-point runout measuring system is shown in FIGS. 10A, 10B and 10C. This system has the advantage that the runout measurements for determining the runout error for both camber and toe are obtained by sensor measurements only in the camber plane, i.e., only the inclinometer I is used in making measurements. The use of a single sensor for determining runout error in two planes is the subject of a separate copending patent application entitled "Method and Apparatus for Providing Runout Compensation" by Edmond R. Pelta, filed on Sept. 26, 1977. The disclosure of such application is specifically incorporated herein by reference.

FIGS. 10A, 10B and 10C illustrate, in consecutive order, a specific procedure for rotating the wheel into three separate positions to produce signals representative of camber and toe and to produce signals which may be used to provide for runout compensation for camber and toe, the latter signals using the measurements only from the camber plane in computing this runout compensation for both planes. As shown in FIG. 10A, the measurement apparatus is that shown in FIGS. 1-5 (with the support bracket 36 and the sensors carried thereby not being shown) and is mounted on a vehicle wheel such as the left front wheel LW shown in FIGS. 1 through 3 and with the fixture LF positioned thereon in the manner previously pointed out. In addition, and as shown in FIGS. 10A-10C, the slide 32 of the fixture is provided with three bubble level devices 90a, 90b, 90c which respectively indicate each of the three rotative positions into which the wheel is turned. The right wheel RW would also have the fixture RF and its associated measuring equipment mounted thereon in a similar manner.

In the first step of the runout correction measurement procedure, the wheel is rotated to the position shown in FIG. 10A. The circuitry is then set in a runout error detection mode by activating a switch which conditions the microprocessor circuitry (in a manner to be explained presently). With the system thus activated, the first measurement is made, such as by operating a switch, to provide for a measurment from the inclinometer I in the camber plane. This measurement is stored in a register. After this first measurement is taken, the wheel is turned 180° counterclockwise to the position shown in FIG. 10B. At this time the equipment is again activated to take a second reading from the camber sensor I. This measurement is also stored in a register separate from the first reading. Finally, the wheel is rotated 90° counterclockwise to the position shown in FIG. 10C and the read switch is again activated to take a reading at this third and final wheel position. It can be seen, therefore, that readings are taken at each of the positions shown in FIGS. 10A, 10B, and 10C and that all of these readings are available at the conclusion of the measurements for computation of the runout error. The foregoing procedure would be the same for both the right and left wheels with the only difference being in the sign of the signals received from the measurement system. However, the microprocessor which is used to store the readings and to perform the computations adjusts for the various sign differences.

FIG. 11 illustrates the runout circle for both camber and toe for both a right and left wheel using the three-point measuring procedure of FIGS. 10A, 10B and 10C to make the adjustments. Even though the rotation of the wheel is in the same direction for either the right or left wheels, since the wheels are oppositely oriented, this has the effect of providing for an effective rotation in one direction for the right wheel and in the other direction for the left wheel. This is shown by the use of arrows 82 and 84. Arrow 82 would normally represent the direction for the production of signals from the right wheel whereas arrow 84 would represent the direction of rotation for the production of signals for the left wheel. It will be understood, of course, that the runout for the left wheel in any given vehicle is entirely independent of the runout for the right wheel and that the diagram of FIG. 11 is not meant to indicate that they are the same or are in any way related.

In either case, starting from some arbitrary position on the runout circle, a first measurement A may be identified as corresponding to the position shown in FIG. 10A for both the right and left wheels. This would be the position when the wheel fixture LF is horizontally oriented as indicated by bubble level 90a. At this position, the reading A represents the camber reading for both the right and left wheels. The measurement B, which is at a position 180° from the position of the measurement A, represents the reading at the second rotative position as shown in FIG. 10B for both the right and left wheels. In this position the fixture LF is again horizontally oriented as indicated by the bubble level 90b. The measurements Z and Z', which are 90° from the positions of the measurements A and B, represent the readings at the position shown in FIG. 10C for the left and right wheels, respectively. This position, for the left wheel LW, is indicated by the bubble level 90c when the fixture LF is vertically oriented as shown in FIG. 10C. All of the measurements on the runout circle as shown in FIG. 11 are represented by output signals in the camber plane and, in turn, represent measurements in both the camber and toe planes as shown by the vertical and horizontal axes in FIG. 11, the measurements along the vertical axis being in the camber plane and the measurements along the horizontal axis being in the toe plane. The center of the runout circle, indicated as $T_O$ and $C_O$, represents the correct toe and camber signals.

In order to provide for the determination of the camber and toe for both the right and left wheels and using the measurements A, B, Z and Z' shown in FIG. 11 (which are measurements in the camber plane) to provide for runout compensation, the following conditions should be met for the left side of the vehicle.

$C_O = C_L + \Delta C_L \rightarrow \Delta C_L$ should be positive $T_O = T_L - \Delta T_L \rightarrow \Delta T_L$ should be negative For the right side of the vehicle the following conditions should be met.

$C_O = C_R - \Delta C_R \rightarrow \Delta C_R$ should be negative $T_O = T_R + \Delta T_R \rightarrow \Delta T_R$ should be positive It can be seen from FIG. 11 that $\Delta T_L$ and $\Delta T_R$ are shown twice, once in the toe plane and once in the camber plane. Thus, by the use of simple geometrical relationships, it will be seen that the distances measured in the camber plane will be exactly equal to those that would be measured in the toe plane when the wheel is rotated 90°. In order to determine toe and camber for the right and left wheels, the readings for both the camber and toe planes are used for $C_L$, $T_L$, $C_R$ and $T_R$. However, only the readings in the camber plane (A, B, Z and Z') are used for determining the runout compensating signals $\Delta C_L$, $\Delta T_L$, $\Delta C_R$ and $\Delta T_R$ (as indicated in FIG. 11), and these compensating signals may be solved in accordance with the following underlined equations:

$$\Delta C_l = (\frac{A + B}{2} - Z)$$

$$\Delta T_L = -(A - \frac{A + B}{2}) \text{ or}$$

$$(\frac{A + B}{2} - A)$$

$$\Delta C_R = -(Z' - \frac{A + B}{2}) \text{ or}$$

$$(\frac{A + B}{2} - Z')$$

$$\Delta T_R = (\frac{A + B}{2} - B) \text{ or}$$

$$(A - \frac{A + B}{2})$$

As mentioned previously the foregoing equations, based on the measured camber values A, B, Z and Z', can be solved in a conventional microprocessor using conventional programming techniques. Thus, FIG. 12 illustrates the flow chart for programming a microprocessor to carry out the runout compensation technique of the present invention. With an internal counter S being set to "zero," the runout compensation subroutine is entered when the aforedescribed runout switch is activated. The current reading (denoted as "Z") is read and the counter is updated by one increment (to S+1). Then, with S=1, the value Z is entered in a register A. The subroutine is then left in order to perform the various other parts of the program, which are unrelated to the present invention.

After the wheel has been rotated to the second rotative position and the "read" switch activated, the subroutine is again entered, the counter S updated, and the reading Z entered in register B. After the wheel has been rotated to the third and final rotative position and the "read" switch has been again activated, the subroutine is entered for the last time to obtain the final reading Z and to update the counter. At S=3, the computations for $\Delta C_L$, $\Delta T_L$, $\Delta C_R$ and $\Delta T_R$ are carried out as shown using the stored values A and B and the current Z value (Z' for the right wheel). At the conclusion of the computation steps, the counter is set back to zero and the subroutine is exited. The runout switch is then deactivated and the wheels are set back down on the ground without changing their relative rotated positions. The wheels are now ready to be adjusted in accordance with normal wheel alignment procedures with the runout errors in both camber and toe being taken into account in making all further measurements.

Although the best modes contemplated for carrying out the present invention have been herein shown and described, it will be apparent that modification and variation may be made without departing from what is regarded to be the subject matter of the invention.

What is claimed is:

1. In a method of correcting for alignment measuring instrument runout error wherein the measuring instrument is installed on a vehicle wheel, said measuring instrument comprising a fixture that is detachably mounted on said wheel, sensor means on said fixture for detecting the angular inclination of said fixture, and signal means responsive to said sensor means for providing signals proportional to the angular inclination of said fixture in a selected alignment plane, said method comprising the obtaining of a fixture inclination signal from the signal means at a particular rotative position of the wheel, determining the runout error of the wheel at said rotative position of the wheel, and adding or subtracting a signal corresponding to said runout error from a fixture inclination signal at said rotative wheel position to obtain a true inclination signal for said wheel at said rotative position; the improvement comprising the steps of obtaining the fixture inclination signal from said signal means at a first rotative position of the wheel, rotating the wheel to a second position and obtaining the fixture inclination signal from said signal means at said second rotative position of the wheel, rotating the wheel to a third position and obtaining the fixture inclination signal from said signal means at said third rotative position of the wheel, and computing the runout error of the sensor means at said third rotative position based on said fixture inclination signals from the first, second and third rotative positions of the wheel.

2. In a method of correcting for alignment measuring instrument runout error as set forth in claim 1 wherein two of said rotative positions are 180° apart and wherein the third rotative position is 90° from said two rotative positions.

3. In a method of correcting for alignment measuring instrument runout error as set forth in claim 1 wherein said rotative positions are 120° apart.

4. In a method of correcting for alignment measuring instrument runout error as set forth in claim 1 wherein said selected alignment plane is a vertical plane so that said fixture inclination signals represent wheel camber.

5. The method of correcting alignment measuring instrument runout error wherein the measuring instrument is installed on a vehicle wheel, said instrument comprising a fixture that is detachably mounted on said wheel, said instrument also comprising a sensor support member that is rotatably mounted on said fixture about an axis that is determined by the mounted position of the fixture, said sensor support member being gravity stabilized as the wheel and fixture are rotated about the wheel axis, sensor means on said stabilized support member for detecting the angular inclination of said fixture axis during said wheel rotation, and signal means responsive to said sensor means for providing signals proportional to the angular inclination of said fixture axis in a selected alignment plane; said method comprising the steps of elevating said wheel from the ground, obtaining said inclination signal from said sensor means at a first rotative position of the wheel, rotating said wheel to a second position and obtaining the inclination signal from said signal means at said second rotative position of the wheel, rotating the wheel to a third position and obtaining the inclination signal from said signal means at said third rotative position of the wheel, computing a runout error signal based on said inclination signals from the first, second and third rotative positions of the wheel that is proportional to the angular runout of said fixture axis in said alignment plane present at said third rotative position of said wheel, storing said runout error signal, lowering said wheel to the ground while the wheel remains at said third rotative position, obtaining a final fixture axis inclination signal from said sensor means in said selected alignment plane when the wheel is lowered, and subtracting said runout error signal from said final inclination signal to provide a corrected alignment signal that represents the true wheel axis inclination in said selected alignment plane, corrected for runout error.

6. The method of claim 5 wherein two of said rotative positions are 180° apart and wherein the third rotative position is 90° from said two rotative positions.

7. Apparatus for correcting for alignment measuring instrument runout error in a vehicle wheel alignment system of the type wherein a fixture is detachably mounted on a wheel which has been raised off its underlying support surface, said fixture including sensor means for detecting the angular inclination of said fixture during rotation of said wheel, and signal means responsive to said sensor means for providing signals proportional to the angular inclination of said fixture in a selected alignment plane; said apparatus comprising means connected to said sensor means for storing the fixture inclination signals during successive positioning of said wheel at two different rotative positions, and means for computing the runout error of said fixture in said selected alignment plane when the wheel is at a third rotative position based on the inclination signals at said third rotative position and the stored signals obtained at said prior two rotative positions of the wheel, said third rotative position being different from either of said first two rotative positions.

8. Apparatus for correcting for alignment measuring instrument runout error as set forth in claim 7 wherein said computing means is arranged to compute said runout error when said three rotative positions of the wheel are arbitrarily chosen.

9. Apparatus for correcting for alignment measuring instrument runout error as set forth in claim 7 wherein said computing means is arranged to compute said runout error when two of said three rotative positions of the wheel are 180° apart and when the third rotative position is 90° from the two rotative positions.

10. Apparatus for correcting for alignment measuring instrument runout error as set forth in claim 7 wherein said three rotative positions of the wheel are angularly spaced at 120° intervals and wherein said computing means includes means for adding the inclination signals at said three rotative positions, dividing the sum obtained by three, and subtracting from the quotient the inclination signal from the third rotative position.

11. An apparatus for providing runout compensation for measuring instrument wobble present in the measurements made of the angular inclination of a vehicle wheel relative to a selected alignment plane, said apparatus including sensor means for producing signals representative of the inclination of said wheel with respect to said alignment plane, said sensor means being mounted on said instrument which is coupled to said wheel, means for receiving and storing the sensor means signals at first and second rotative positions of the wheel, and means for computing the runout error of the measuring instrument relative to said alignment plane when the wheel is at a third rotative position based on the signal at said third rotative position and the stored signals obtained at said first and second rotative positions of the wheel, each of said rotative positions being different from the other two.

12. An apparatus for providing runout compensation as set forth in claim 11 wherein said computing means is arranged to compute said runout error when two of said three rotative positions of the wheel are 180° apart and when the third rotative position is 90° from the two rotative positions.

13. An apparatus for providing runout compensation as set forth in claim 12 wherein said selected alignment plane is a vertical plane and wherein said sensor means provides signals indicative of the camber of said vehicle wheel.

14. An apparatus for providing runout compensation as set forth in claim 11 wherein said computing means comprises circuitry which determines the true value of the wheel inclination with respect to said alignment plane and with respect to an alignment plane perpendicular thereto according to the following formulae wherein $x_s$ and $y_s$ define said true values in the alignment planes, $x_1$, $x_2$ and $x_3$ are said sensor signals in said selected alignment plane; and $y_1$, $y_2$ and $y_3$ are sensor signals in the alignment plane perpendicular to said selected alignment plane:

$$y_s = \frac{(y_2^2 - y_1^2 + x_2^2 - x_1^2)(x_3 - x_2) - (y_3^2 - y_2^2 + x_3^2 - x_2^2)(x_2 - x_1)}{2(y_2 - y_1)(x_3 - x_2) - 2(x_2 - x_1)(y_3 - y_2)}$$

$$x_s = \frac{(y_3^2 - y_2^2 + x_3^2 - x_2^2)(y_2 - y_1) - (y_2^2 - y_1^2 + x_2^2 - x_1^2)(y_3 - y_2)}{2(y_2 - y_1)(x_3 - x_2) - 2(x_2 - x_1)(y_3 - y_2)}$$

* * * * *

Disclaimer 4,180,915.—*Melvin H. Lill*, San Jose and *James L. Wiederrich*, Lodi, Calif. RUNOUT COMPENSATION IN VEHICLE WHEEL ALIGNMENT MEASURING APPARATUS. Patent dated Jan. 1, 1980. Disclaimer filed Mar. 17, 1980, by the assignee, *FMC Corporation*.

Hereby disclaims the term of said patent subsequent to Feb. 13, 1996.

[*Official Gazette, May 27, 1980.*]